United States Patent
Inagaki et al.

(10) Patent No.: US 7,142,970 B2
(45) Date of Patent: Nov. 28, 2006

(54) VEHICULAR BRAKE FORCE CONTROL APPARATUS AND METHOD

(75) Inventors: Shoji Inagaki, Toyota (JP); Kenji Asano, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 375 days.

(21) Appl. No.: 10/718,613

(22) Filed: Nov. 24, 2003

(65) Prior Publication Data

US 2004/0117099 A1 Jun. 17, 2004

(30) Foreign Application Priority Data

Dec. 17, 2002 (JP) ............... 2002-364708

(51) Int. Cl.
    *G06F 7/70* (2006.01)
(52) U.S. Cl. .................... 701/70; 701/69; 701/83; 701/84; 180/197
(58) Field of Classification Search ........... 701/69–71, 701/73, 78–80, 82–84, 90; 303/139–140, 303/146, 148–152, 113.2, 115.2; 188/68, 188/156, 181 R, 181 A, 181 C, 181 T, 182; 477/183, 185; 180/165, 197–198
See application file for complete search history.

(56) References Cited

U.S. PATENT DOCUMENTS

| | | | |
|---|---|---|---|
| 5,895,100 A | 4/1999 | Ito et al. | 303/152 |
| 5,947,221 A * | 9/1999 | Taniguchi et al. | 180/197 |
| 6,089,677 A * | 7/2000 | Fukumura et al. | 303/112 |
| 6,317,677 B1 * | 11/2001 | Monzaki et al. | 701/84 |
| 6,374,162 B1 * | 4/2002 | Tanaka et al. | 701/1 |
| 6,447,076 B1 | 9/2002 | Ito et al. | 303/150 |
| 6,811,229 B1 * | 11/2004 | Soga | 303/152 |
| 6,895,317 B1 * | 5/2005 | Yasui et al. | 701/36 |
| 6,941,214 B1 * | 9/2005 | Watanabe et al. | 701/80 |
| 6,957,874 B1 * | 10/2005 | Hara et al. | 303/152 |
| 2002/0036429 A1 | 3/2002 | Shimada et al. | 303/152 |

FOREIGN PATENT DOCUMENTS

| | | |
|---|---|---|
| DE | 199 09 453 A1 | 3/2000 |
| EP | 0 351 576 A2 | 1/1990 |
| EP | 1 080 972 A2 | 3/2001 |
| JP | A 10-71939 | 3/1998 |
| JP | A 10-264791 | 10/1998 |

* cited by examiner

*Primary Examiner*—Gertrude A. Jeanglaude
(74) *Attorney, Agent, or Firm*—Oliff & Berridge, PLC

(57) ABSTRACT

In a vehicular brake force control apparatus, an engine brake force Feb is calculated; a road surface friction coefficient μ and a rear wheel degree of grip εr is calculated; and a threshold value Ke is calculated such that the threshold value Ke increases as the road surface friction coefficient μ becomes smaller. When the rear wheel degree of grip εr is smaller than the threshold value Ke, it is determined that vehicle behavior of a vehicle is liable to become unstable when the engine brake force Feb acts. In this case, a sum of the engine brake force Feb and a target friction brake force Fbv based upon a steering operation amount of a driver is distributed to each wheel in accordance with a distribution that stabilizes the vehicle behavior of the vehicle. Based on this distribution result, a friction brake force and an output torque of the engine are controlled.

22 Claims, 5 Drawing Sheets

VEHICULAR BRAKE FORCE CONTROL APPARATUS AND METHOD

INCORPORATION BY REFERENCE

The disclosure of Japanese Patent Application No. 2002-364708 filed on Dec. 17, 2002 including the specification, drawings and abstract is incorporated herein by reference in its entirety.

BACKGROUND OF THE INVENTION

1. Field of the Invention

The invention relates to a vehicular brake force control apparatus and a vehicular brake force control method, and more particularly, a vehicular brake force control apparatus and a vehicular brake force control method that control a brake force when engine brake is acting.

2. Description of the Related Art

As one type of brake force control apparatus for vehicles such as an automobile, a brake force control apparatus has been known that controls a brake force of each wheel while taking into consideration engine brake. For example, Japanese Patent Laid-Open Publication No. JP-A-10-264791 discloses a brake force control apparatus in which a target brake force is calculated based on a depression amount of a brake pedal; a brake force for driven wheels is derived from negative torque of a drive power source; and a brake force distribution ratio for the brake forces that it is necessary to distribute to the driven wheels and non-driven wheels is determined based on the driving conditions of the vehicle. Then, a brake command value for the driven wheels and the non-driven wheels is derived based on the target brake force, the brake force distribution ratio, and the negative torque portion (engine brake force) of the drive power source, and finally, the brake force of each wheel is controlled based on the command value.

Moreover, Japanese Patent Laid-Open Publication No. JP-A-10-264791 discloses a brake force control apparatus for a rear-wheel drive vehicle that, when engine brake is acting on the rear driven wheels, increases a brake force of the front wheels such that a brake force distribution of the front and rear wheels becomes appropriate.

However, with the conventional brake force control apparatus like that disclosed in Japanese Patent Laid-Open Publication No. JP-A-10-264791, the brake forces of the driven wheels and the non-driven wheels are controlled based upon the target brake force, the brake force distribution ratio, and the engine brake force. When engine brake is acting, the brake force of the non-driven wheel is always controlled by operation of a friction brake device. Accordingly, load of the friction brake device of the non-driven wheel increases, and durability of the friction brake device is liable to be reduced.

SUMMARY OF THE INVENTION

It is an object of the invention to improve the durability of respective friction brake devices of non-driven wheels by reducing load thereupon-this is realized by only operating the respective friction brake devices of the non-driven wheels in circumstances in which it is necessary to distribute the engine brake force to the non-driven wheels as well as to the driven wheels.

According to a first aspect of the vehicular brake force control apparatus of the invention, it is determined whether vehicle behavior of a vehicle is liable to become unstable when engine brake acts. In the case that it is determined that the vehicle behavior is liable to become unstable, an engine brake force when engine brake acts is estimated. Then, the estimated engine brake force is distributed to each wheel as a brake force in accordance with a distribution that stabilizes the vehicle behavior of the vehicle, and at least one of an actual engine brake force and an actual friction control force that are applied to each wheel are controlled such that the brake force distributed to each wheel is attained.

According to a second aspect of the vehicular brake force control apparatus according to the invention, the vehicle is a rear wheel drive vehicle, and the apparatus is configured such that it is determined that the vehicle behavior is liable to become unstable when engine brake acts in the case that a degree of grip of the rear wheel is equal to or less than a predetermined value.

Moreover, a third aspect of the vehicle brake force control apparatus according to the invention is configured such that a threshold value used for occasions when it is determined that the vehicle behavior is liable to become unstable is reduced in accordance with a road surface friction coefficient becoming smaller.

According to the first aspect of the invention, it is determined whether the vehicle behavior is liable to become unstable when engine brake acts. In the case that it is determined that the vehicle behavior is liable to become unstable, the engine brake force when engine brake acts is estimated. Then, the estimated engine brake force is distributed to each wheel as the brake force in accordance with the distribution that stabilizes the vehicle behavior, and at least one of the actual engine brake force and the actual friction control force that are applied to each wheel are controlled such that the brake force distributed to each wheel is attained. As a result of this configuration, when it is not liable that the vehicle behavior of the vehicle will become unstable, the engine brake force is not distributed among the brake forces for the respective wheels. Accordingly, as compared to the conventional brake force control apparatus in which the engine brake force is distributed among the respective brake forces of the wheels regardless of whether the vehicle behavior is liable to become unstable, it is possible to improve durability of the friction brake device in the non-driven wheel by reducing the load thereupon.

Further, generally, in the case of rear wheel drive vehicles, increase of braking force of the rear wheels caused by engine brake acting when the degree of grip of the rear wheels is low, is liable to cause vehicle behavior to become unstable since the lateral force of the rear wheels reduces.

According to the second aspect described above, the vehicle is the rear wheel drive vehicle. Further, it is determined that the vehicle behavior is liable to become unstable when engine brake acts, when the degree of grip of the rear wheel is equal to or less than the predetermined value. Accordingly, it is possible to reliably determine whether the vehicle behavior is liable to become unstable when engine brake acts due to the lateral force of the rear wheel reducing as a result of the brake force of the rear wheel increasing.

Moreover, generally, the force that the wheels of a vehicle can generate decreases as road surface friction coefficient becomes smaller. Accordingly, as road surface friction coefficient becomes smaller, vehicle behavior is liable to become unstable, and moreover, after vehicle behavior has become unstable once, it is increasingly difficult to recover a stable state.

According to the third aspect described above, as the road surface friction coefficient becomes smaller, the threshold value used on occasions when determining whether the vehicle behavior is liable to become unstable is reduced. Accordingly, as compared to when the road surface friction coefficient is not taken into consideration, it is possible to accurately determinate whether the vehicle behavior is liable to become unstable.

It should be noted that the term "degree of creep" as used in this specification refers to a value ($\epsilon$) that is obtained by dividing a difference between a force that can potentially be generated by the wheels acting along a road surface direction and a force that is generated by the wheels acting along the road surface direction, by the force that can potentially be generated by the wheels along the road surface direction. Moreover, if the value obtained by dividing the force that is generated by the wheels acting along the road surface direction by the force that can potentially be generated by the wheels acting along the road surface direction is taken to be a utilization factor $\mu$, the degree of creep $\epsilon$ is equal to (1−utilization factor $\mu$).

According to a preferred form of the invention, the first aspect described above is configured such that the engine brake force is controlled based upon the brake force that is smallest among the brake forces distributed to driven wheels (preferred form 1).

Moreover, according to another preferred form of the invention, the first aspect described above is configured such that, when a brake operation is executed by a driver, an overall vehicle target friction brake force based upon a brake operation amount of the driver is estimated, and a sum of the estimated engine brake force and the estimated overall vehicle target friction brake force is distributed among the respective wheels (preferred form 2)

According to yet another preferred form of the invention, the first aspect described above is configured such that a ground load of each wheel is estimated, and the engine brake force is distributed to the respective wheels in accordance with a ratio that corresponds with a ratio of the ground loads of the wheels (preferred form 3).

According to yet another preferred form of the invention, the second aspect described above is configured such that a ground load of each wheel is estimated, and the sum of the estimated engine brake force and the estimated overall vehicle target friction brake force is distributed among the respective wheels in accordance with a ratio corresponding to a ratio of the ground loads of the respective wheels (preferred form 4).

In addition, according to yet another preferred form of the invention, the first aspect described above is configured such that a vehicle target yaw rate is calculated based upon a steering amount of the driver; and a difference between the vehicle target yaw rate and a vehicle actual yaw rate is calculated. Then, the engine brake force is distributed to the respective wheels such that a magnitude of the difference between the vehicle target yaw rate and the vehicle actual yaw rate reduces (preferred form 5).

According to yet one more preferred form of the invention, the second aspect described above is configured such that a vehicle target yaw rate is calculated based upon a steering amount of the driver; and a difference between the vehicle target yaw rate and a vehicle actual yaw rate is calculated. Then, the sum of the estimated engine brake force and the estimated overall vehicle target friction brake force is distributed among the respective wheels such that a magnitude of the difference between the vehicle target yaw rate and the vehicle actual yaw rate reduces (preferred form 6).

Moreover, according to yet another preferred form of the invention, the second aspect is such that it is determined that the vehicle behavior is liable to become unstable when engine brake acts in the case that the vehicle is in a non-driven state and the degree of grip of the rear wheel is equal to or below the predetermined value (preferred form 7).

According to yet one further form of the invention, the second aspect is configured such that a road surface friction coefficient $\mu$ is estimated, and a front-rear acceleration Gxr at a rear wheel position and a lateral acceleration Gyr at the rear wheel position are estimated. Then, the degree of grip of the rear wheel is calculated based on the road surface friction coefficient $\mu$, the front-rear acceleration Gxr, and the lateral acceleration Gyr (preferred form 8).

According to a fourth aspect of the invention, a vehicular brake force control method comprises the steps of: determining whether vehicle behavior of a vehicle is liable to become unstable when engine brake acts; estimating an engine brake force when engine brake acts in the case that it is determined that the vehicle behavior of the vehicle is liable to become unstable; distributing the estimated engine brake force to each wheel as a brake force in accordance with a distribution that stabilizes the vehicle behavior of the vehicle; and controlling at least one of an actual engine brake force and an actual friction control force that are applied to each wheel, such that the brake force distributed to each wheel is attained.

DETAILED DESCRIPTION OF THE PREFERRED EMBODIMENTS

Hereinafter, a preferred embodiment (hereinafter referred to simply as "embodiment") of the invention will be described in detail with reference to the appended drawings.

Figure 1:
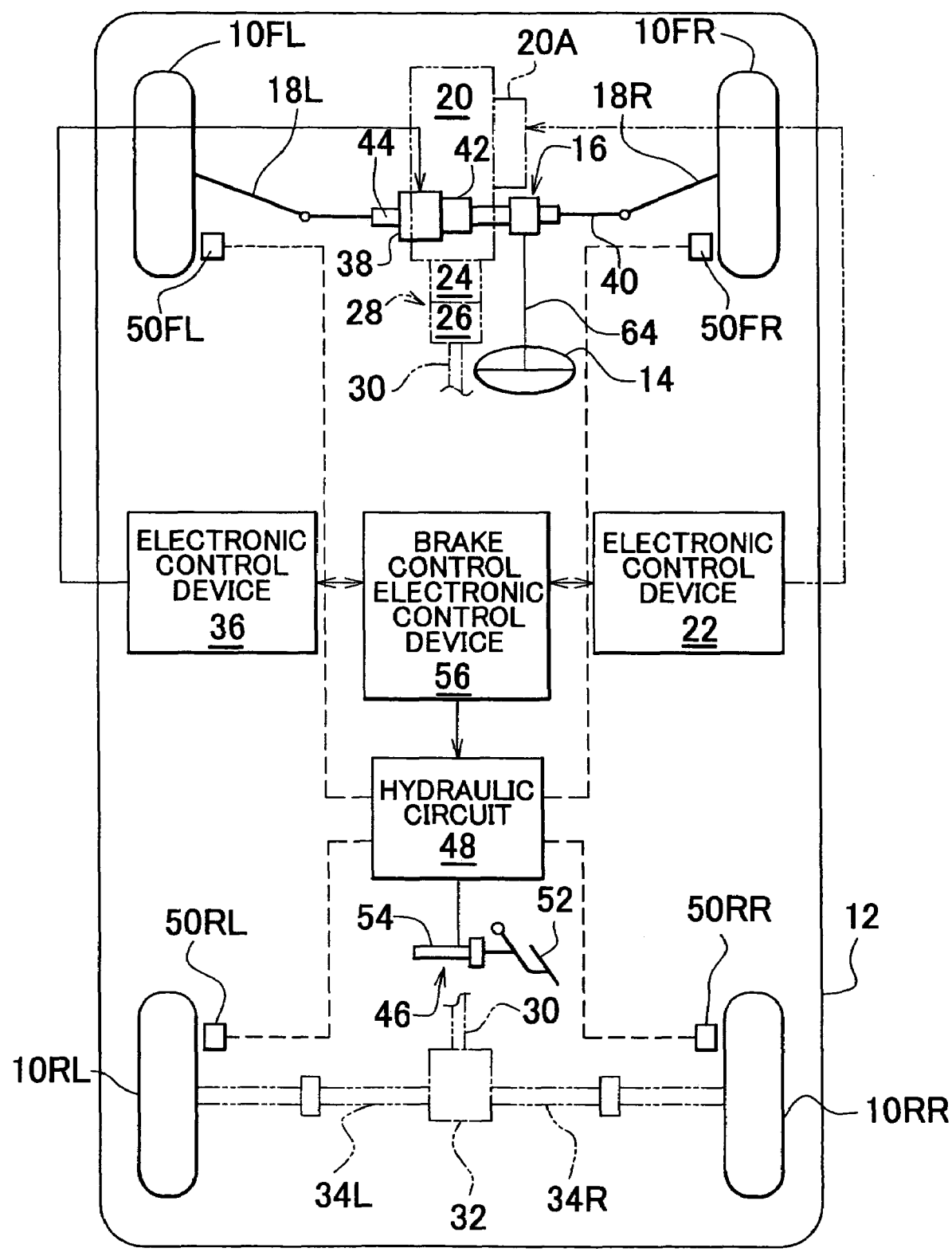
FIG. 1 schematically shows a construction of an embodiment of a vehicular brake control apparatus according to the invention that has been applied to a rear wheel drive vehicle provided with a motor operated power steering device.

FIG. 1 schematically shows a configuration of this embodiment in which a vehicular brake control apparatus according to the invention has been applied to a rear wheel drive vehicle provided with a motor operated power steering device.

FIG. 1 shows a vehicle 12 having left and right front wheels 10FL and 10FR, and left and right rear wheels 10RL and 10RR. The left and right front wheels 10FL and 10FR are non-driven wheel and acts as the steering wheels. The left and right front wheels 10FL and 10FR are steered via tie rods 18L and 18R by a rack-and-pinion type motor operated power steering device 16 that is driven in response to a steering operation of a steering wheel 14 by a driver.

Further, FIG. 1 also shows an engine 20 provided with an electronically controlled throttle value 20A. An output of the engine 20 is controlled by control of the electronically controlled throttle value 20A by an engine electronic control device 22. A driving force of the engine 20 is transmitted to a propeller shaft 30 via an automatic transmission 28 that includes a torque converter 24 and a transmission 26. A driving force of the propeller shaft 30 is then transmitted to the left rear wheel shaft 34L and the right rear wheel shaft 34R by a differential gear 32—accordingly, the left and right rear wheels 10RL and 10RR, which are driven wheels, are rotatably driven.

In the embodiment shown in FIG. 1, the motor operated power steering device 16 utilizes a coaxial rack and pinion, and is controlled by an electronic control device 36. The motor operated power steering device 16 is provided with an electric motor 38, and a conversion mechanism 42 (for example, a ball-screw-type conversion mechanism) that converts a rotation torque of the electric motor 38 into a force that acts in a reciprocating movement direction of a rack bar 40. The power steering device 16 generates a steering assistance torque in order to reduce an operating load of the driver, by generating an assistance steering force that drives the rack bar 40 such that it moves in a relative manner with respect to a housing 44.

A brake force of each wheel is controlled by controlling respective brake pressures of wheel cylinders 50FL, 50FR, 50RL and 50RR using a hydraulic circuit 48 of a brake device 46. The hydraulic circuit 48 includes a reservoir, an oil pump, and various valve devices that are not shown in FIG. 1. The brake force of each wheel cylinder 50FL to 50RR is normally controlled by a master cylinder 54 that is driven in accordance with a depression operation of a brake pedal 52 by the driver. However, when necessary, the brake force of each wheel cylinder 50FL to 50RR is controlled by an electronic control device 56 that will be described later.

Figure 2:
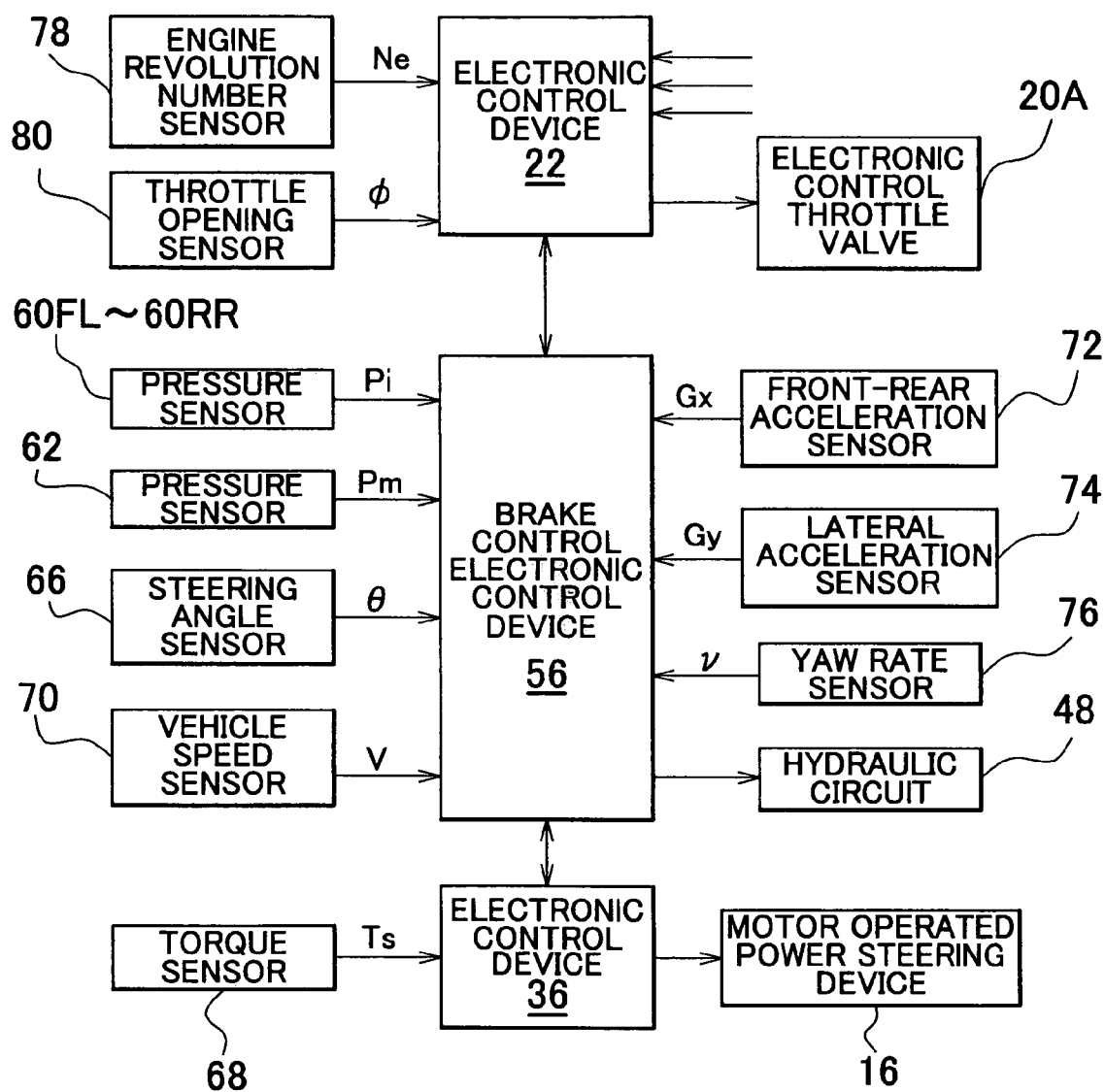
FIG. 2 is a block figure showing a control system of the embodiment shown in FIG. 1.

The respective wheel cylinders 50FL to 50RR of the wheels 10FL to 10RR are provided with respective pressure sensors 60FL to 60RR, shown in FIG. 2, that detect respective wheel cylinder internal brake pressures Pi (i is replaced by fl, fr, rl and rr to denote the respective brake pressures) corresponding to the wheel cylinders 50FL to 50RR. The master cylinder 54 is provided with a pressure sensor 62 that detects a master cylinder pressure PM. Moreover, a steering shaft 64 is provided with a steering angle sensor 66 and a torque sensor 68 that respectively detect a torque angle φ and a steering torque Ts. The vehicle 12 is also provided with a vehicle speed sensor 70, a front-rear acceleration sensor 72, a lateral acceleration sensor 74, and a yaw rate sensor 76 that detect, respectively, a vehicle speed V, a vehicle front-rear acceleration Gx, a vehicle lateral acceleration Gy, and a vehicle yaw rate γ. It should be noted that detection of the torque angle φ, the steering torque Ts, the lateral acceleration Gy, and the yaw rate γ by the steering angle sensor 66, the torque sensor 68, the lateral acceleration sensor 74, and the yaw rate sensor 76, respectively, is executed with a right turn direction of the vehicle taken as positive.

As shown in FIG. 2, signals that indicated the detection results of the various sensors are input to the electronic control device 56. More, specifically, these signals are: signals that respectively indicate each brake pressure Pi within the respective wheel cylinders 50FL to 50RR detected by the oxygen sensors 60FL to 60RR; a signal that indicates the steering angle φ detected by the steering angle sensor 66; a signal that indicates the vehicle speed V detected by the vehicle speed sensor 70; a signal that indicates the front-rear acceleration Gx detected by the front-rear acceleration sensor 72; a signal that indicates the lateral acceleration Gy detected by the lateral acceleration sensor 74; and a signal that indicates the yaw rate detected by the yaw rate sensor 76.

An engine revolution no. sensor 78, shown in FIG. 2, that detects an engine revolution no. Ne. is provided in the engine 20, shown in FIG. 1. A throttle opening degree sensor 80 that detects a throttle opening degree φ is provided in the electronic control throttle valve 20A. A signal indicating the engine revolution no. Ne and a signal indicating the throttle opening degree φ are input to the engine electronic control device 22. Along with these, other signals including a signal indicating an accelerator opening from an accelerator opening sensor, not shown, and a signal indicating an intake air amount from an intake air amount sensor, not shown, are also input to the engine electronic control device 22. The engine electronic control device 22 outputs the signal indicating the engine revolution no. Ne and the signal indicating the throttle opening degree φ to the electronic control device 56.

A signal indicating the steering torque Ts detected by the torque sensor 68, as well as the signal indicating the vehicle speed V from the electronic control device 56, are input to the electronic control device 36. The electronic control device 36 outputs the signal indicating the steering torque Ts to the electronic control device 56.

Although not shown in the figures, it should be noted that the electronic control devices 22, and 56 have, respectively, for example, a CPU, a ROM, a RAM, and an input/output port unit, and include a micro-computer with a known configuration in which the previously mentioned elements are inter-connected by a common bus that is bi-directional.

Figure 3:
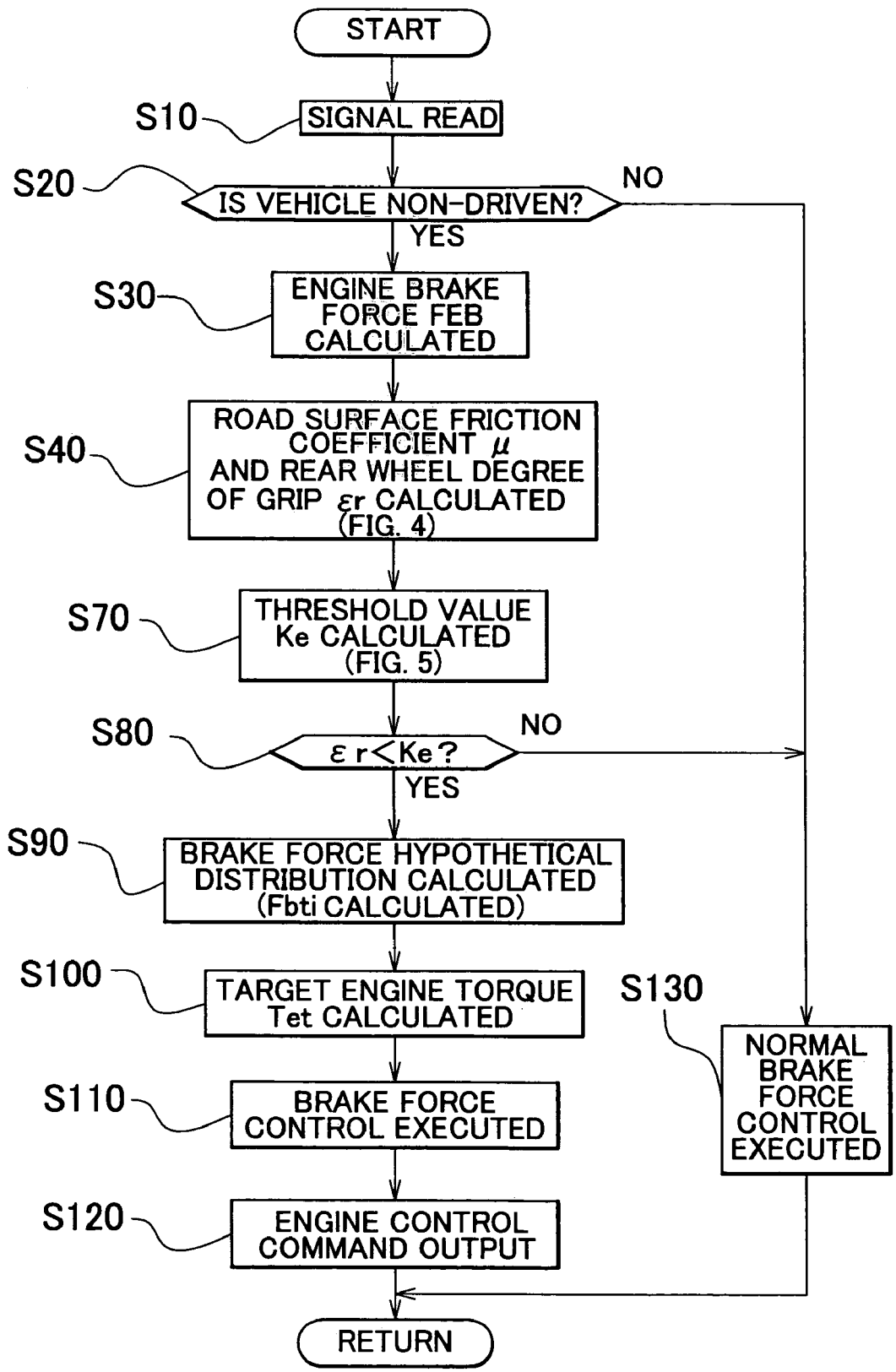
FIG. 3 is a general flow chart showing a brake force control routine of the embodiment shown in FIG. 1.

The electronic control device 56 determines whether the vehicle is being driven or not driven by the engine 20 in accordance with the flow chart shown in FIG. 3. When the vehicle is non-driven, an engine brake force Feb is calculated, and a road surface friction coefficient μ and a rear wheel degree of grip εr are calculated. Then, the electronic control device 56 determines whether the vehicle is in a state in which vehicle behavior will become unstable when engine brake acts based on the rear wheel degree of grip εr.

In addition, when it is determined that the vehicle behavior will become unstable state when engine brake acts, the electronic control device 56 calculates an overall vehicle target friction brake force Fbv based on the master cylinder pressure Pm. The sum of the engine brake force Feb and the target friction brake force Fbv is taken as an overall vehicle target brake force Fbvt. Then target brake forces Fbti (i is replaced by fl, fr, rl and rr to denote the respective target brake forces) for each wheel are calculated by hypothetically distributing the overall vehicle target brake force Fbvt amongst the wheels using a hypothetical distribution that stabilizes the vehicle behavior.

Moreover, the electronic control device 56 calculates a target output torque Tet (a negative value) of the engine 20 based upon the value which is smaller among the target brake forces Fbtrl and Fbtrr for the left and right rear wheels 10RL and 10RR that are the driven wheels. The electronic control device 56 then calculates a target throttle opening degree φt based on the target output torque Tet and the engine revolution no. Ne, and outputs a command signal indicating this target throttle opening degree φt to the engine electronic control device 22.

Further, the electronic control device 56 controls the respective brake pressures Pi of the wheels 10FL to 10RR such that when the target brake forces Fbtfl and Fbtfr of the left and right front wheels 10FL and 10FR is reached, one of the target brake forces Fbtrl and Fbtrr for the left and right rear wheels 10RL and 10RR is also reached—more specifically, the larger value among the target brake forces Fbtrl and Fbtrr is reached.

It should be noted that the electronic control device 56 estimates the road surface friction coefficient μ, and then calculates a threshold value Ke such that it becomes larger as the road surface friction coefficient μ becomes smaller. Further, the electronic control device 56 determines whether the vehicle is in a state in which the vehicle behavior will become unstable when engine brake acts based upon a determination as to whether the rear wheel degree of grip εr is smaller than the threshold value Ke,.

Figure 7:
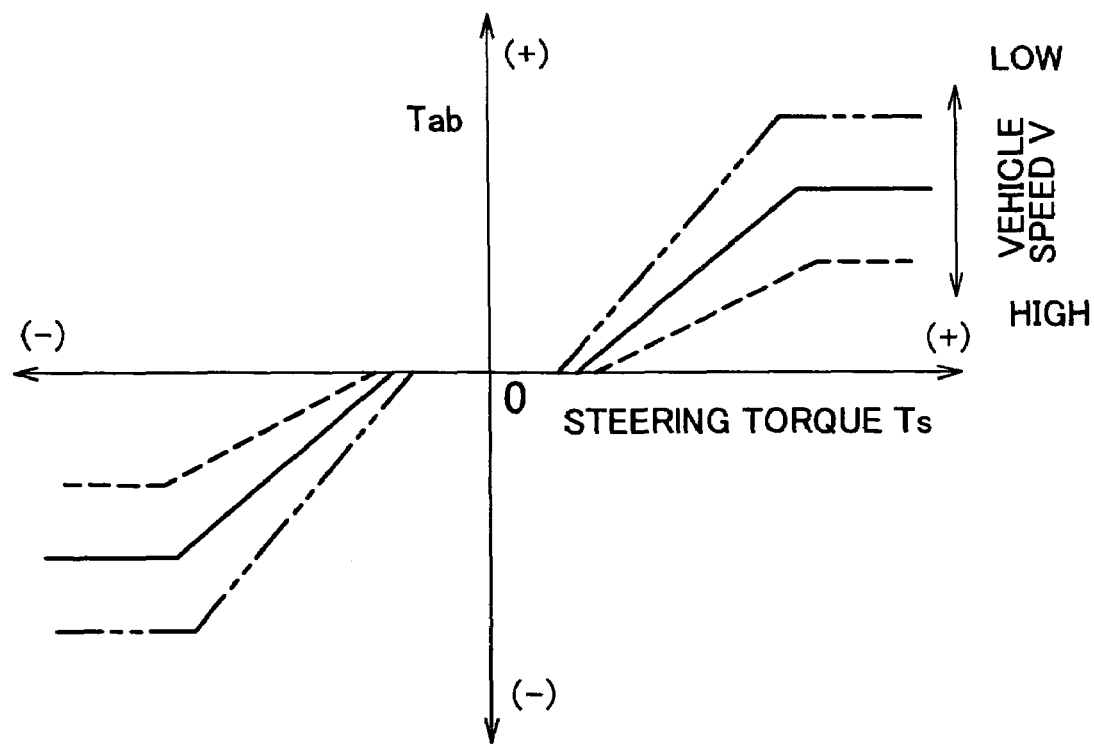
FIG. 7 is a graph showing a relationship between a steering torque Ts, a vehicle speed V and an assistance torque Tab.

The electronic control device 36 calculates an assistance torque Tab using a map corresponding to the graph shown in FIG. 7, based upon the steering torque Ts and the vehicle speed V. This assistance torque Tab is calculated such that the magnitude of the assistance torque Tab increases as the steering torque Ts increases, and such that the magnitude of the assistance torque Tab decreases as the vehicle speed V increases. The motor operated power steering device 16 controls assistance torque via the motor control device 36 based on, at the least, the assistance torque Tab. Accordingly, the operating load of the driver is reduced. Note that the method used for control of the assistance torque by the motor operated power steering device 16 does not specifically fall within the scope of the invention; according, a method that is known within the field may be selected for execution of the control.

Normally, the electronic control device 22 controls the output of the engine 20 through control of the electronically controlled throttle valve 20A based upon the accelerator opening, the intake air amount, and the like. However, if the command value indicating the target throttle opening degree φt is received from the electronic control device 56, the electronic control device 22 executes control of the output of the engine 20 by controlling the electronically controlled throttle valve 20A such that the throttle opening degree φ becomes the target throttle opening degree φt. Note that the method used for control of the engine 20 at normal times does not specifically fall within the scope of the invention; accordingly, a method that is known within the field may be selected for execution of the control.

Next, a brake force control routine of the embodiment shown in the figures will be explained with reference to the flow charts shown in FIG. 3 and FIG. 4. Note that the control routine of the flow chart illustrated in FIG. 3 is initiated by switching an ignition switch, not shown, to ON; the control routine is repeatedly executed at a fixed time interval.

First, in step S10, the respective signals indicating each brake pressure Pi within the wheel cylinders 50FL to 50RR detected by the pressure sensors 60FL to 60RR are read. In step S20, it is determined whether an output torque Te of the engine 20 is zero or less; this output torque Te is estimated using a map corresponding to the graph shown in FIG. 6 based upon, for example, the throttle opening degree φ and the engine revolution no. Ne. Accordingly, it is determined whether the vehicle is in a non-driven state or not. If the determination is negative, the routine proceeds to step S130, whereas if it is positive, the routine proceeds to step S30.

Figure 6:
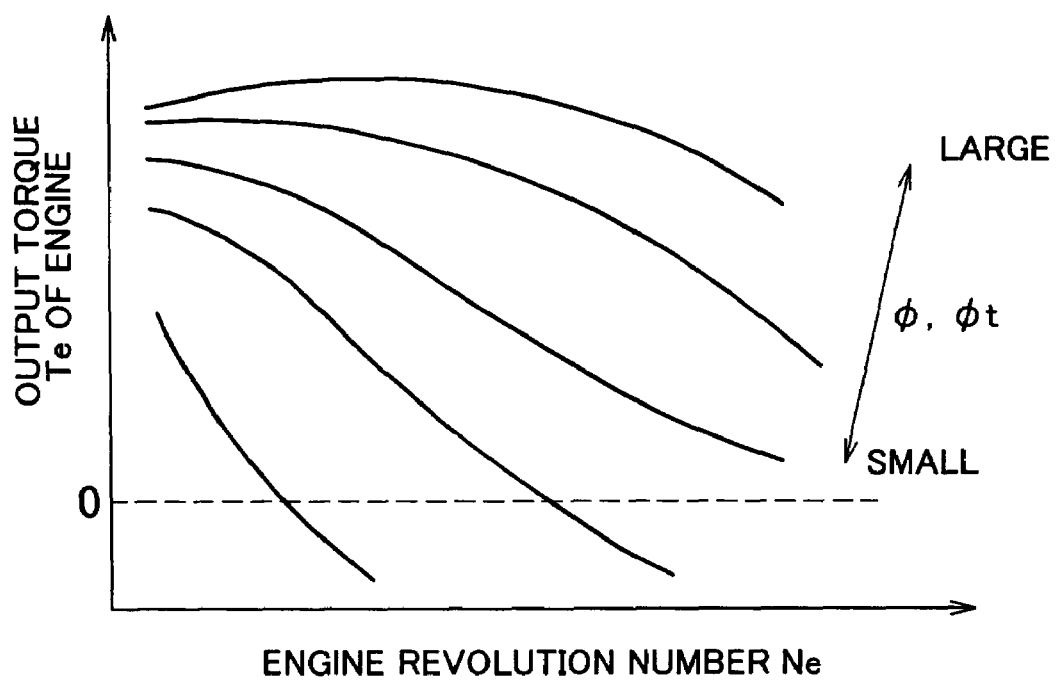
FIG. 6 is a graph showing a relationship between an engine revolution no. Ne, a throttle opening degree $\phi$, an engine output torque Te, and a target output torque Tet.

In step S30, the output torque Te of the engine 20 is calculated using the map corresponding to the graph shown in FIG. 6 based upon the throttle opening degree φ and the engine revolution no. Ne; and the engine brake force Feb is calculated based upon the output torque Te and a gear ratio of the drive train.

Figure 4:
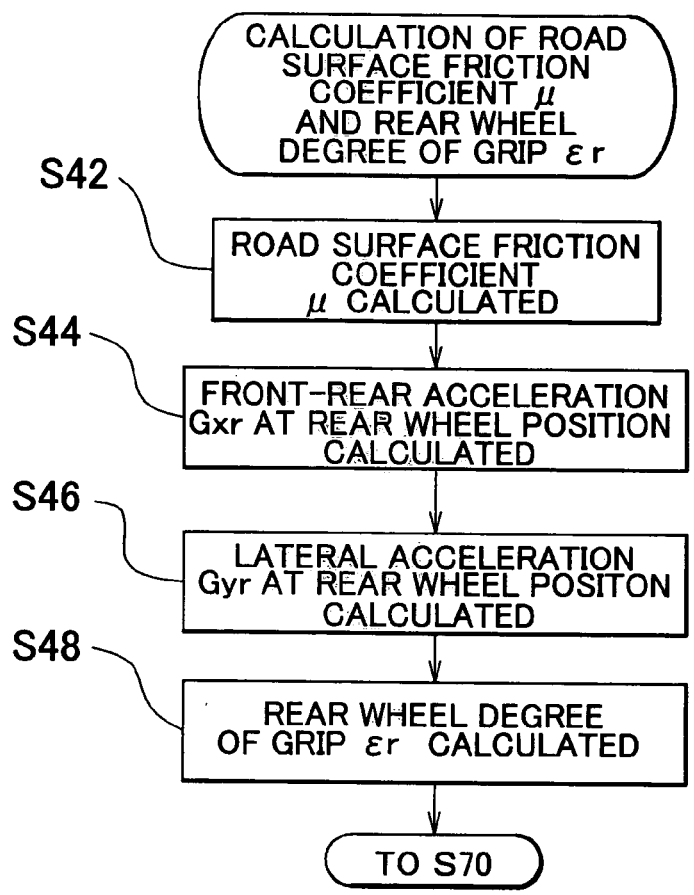
FIG. 4 is a flow chart showing a calculation routine for a road surface friction coefficient $\mu$ and a rear wheel degree of grip $\epsilon r$ that is executed in step S40 of the flow chart shown in FIG. 3.
Figure 5:
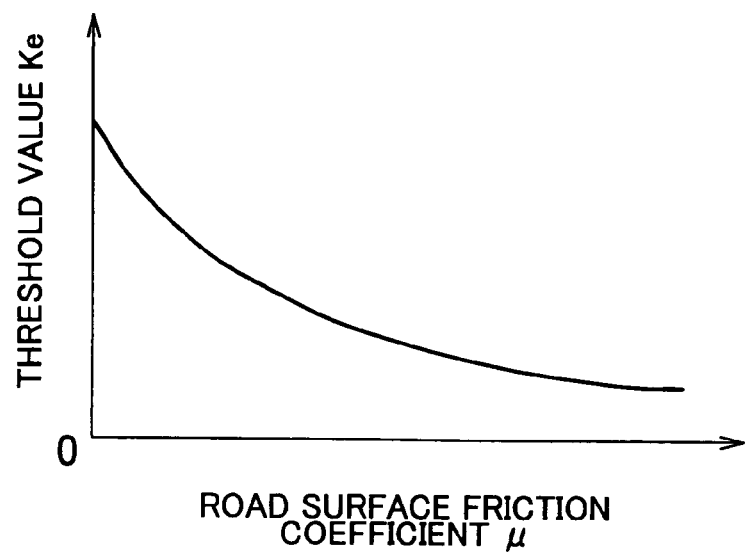
FIG. 5 is a graph showing a relationship between the road surface friction coefficient $\mu$ and a threshold value ke.

In step S40, the road surface friction coefficient μ and the rear wheel degree of grip εr are calculated in accordance with a routine shown in FIG. 4. Then, in step S70, the threshold value Ke is calculated in accordance with a map corresponding to the graph shown in FIG. 5 based upon the road surface friction coefficient μ, such that the threshold value Ke increases as the road surface friction coefficient μ becomes smaller.

In step S80 it is determined whether the rear wheel degree of grip εr is smaller than the threshold value Ke. In other words, it is determine whether it is liable that vehicle behavior will become unstable when the engine brake Feb acts. When the determination is negative, the routine proceeds to step S130, whereas if it is positive the routine proceeds to step S90.

In step S90, the overall vehicle target friction brake force Fbv is calculated as the product of a conversion factor Kv (a positive value) for converting the master cylinder pressure Pm to the overall vehicle brake force, plus the master cylinder pressure Pm. Further, the overall vehicle target brake force Fbvt is calculated as the sum of the engine brake Feb and the target friction brake force Fbv. In addition, a ground load Wi (i is replaced by fl, fr, rl and rr to denote the respective ground loads) is calculated based on the vehicle front-rear acceleration Gx and the vehicle lateral acceleration Gy using a method that is well known within the field of the invention. Respective hypothetical distribution amounts of the target brake force Fbvt for each wheel 10FL to 10RR, namely, the respective target brake forces Fbti (i=fl, fr, rl, rr), are calculated in accordance with Equation (1) below, in which the ground load Wi is W.

$$Fbti = Fbvt \times Wi/W \tag{1}$$

In step S100, first, the value that is smaller among the target brake forces Fbtrl and Fbtrr of the left and right rear wheels, respectively, which are the drive wheels, is taken as Fbtrmin. Then, the target output torque Tet of the engine 20 is calculated based upon a value that is Fbtrmin doubled (a target engine brake Febt) and the gear ratio of the drive train.

In step S110, target brake pressures Pbtfl and Pbtfr for the front left and right wheels 10FL and 10FR are calculated based upon the target brake forces Fbtfl and Fbtfr of the front left and right wheels 10FL and 10FR, respectively. Control is executed such that the brake pressures Pfl and Pfr of the left and right front wheels 10FL and 10FR become equal to the target brake pressures Pbtfl and Pbtfr, respectively. Along with this, a difference Δ Fbtr between the value that is larger among the target brake forces Fbtrl and Fbtrr of the left and right rear wheels 10RL and 10RR and Fbtrmin is calculated. Then, a target brake pressure Pbtr is calculated based upon the difference Δ Fbtr, and control is executed such that the brake pressures Pi of the respective wheels 10FL to 10RR become equal to the target brake pressure Pbtr.

In step S120, the target throttle opening degree φt is calculated based on the target output torque Tet and the engine revolution no. Ne using the map corresponding to the graph in FIG. 6. The command signal indicating the target throttle opening degree φt is then output to the engine electronic control device 22, and following this, the routine returns to step S10.

In step S130, communication of the master cylinder 54 and the wheel cylinders 50FR, 50FL, 50RR and 50RL is maintained, and as a result, normal brake force control is executed in which the brake pressure of each wheel 10FR, 10FL, 10RR and 10RL is controlled by the master cylinder pressure Pm. Following this, the routine returns to step S10.

In step S42 of the calculation routine for the road surface friction coefficient μ and the rear wheel degree of grip εr shown in FIG. 4, for example, the road surface friction coefficient μ is calculated in accordance with Equation (2) below, which is based upon the vehicle front-rear acceleration Gx and the vehicle lateral acceleration Gy. In Equation (2), g is gravitational acceleration.

$$\mu = (Gx^2 + Gy^2)^{1/2}/g \qquad (2)$$

In step S44 a vehicle front-rear acceleration Gxr at a rear wheel position is calculated in accordance with Equation (3) based upon the front-rear acceleration Gx and the yaw rate γ. In Equation (3), Lf and Lr are taken as respective distances between a center of gravity of the vehicle and a front wheel shaft and a rear wheel shaft. Then, in step S46, a coefficient Kr is calculated in accordance with Equation (4), in which a vehicle inertia yaw moment is taken as Iz, and a vehicle mass is taken as M. Along with this, a vehicle lateral acceleration Gyr at the rear wheel position is calculated in accordance with Equation (5), based upon a differential value γd of the vehicle lateral acceleration Gy and the yaw rate γ; and, in step S48, the rear degree of grip εr is calculated in accordance with Equation (6).

$$Gxr = Gx \cdot (Lf + L)/Lf \qquad (3)$$

$$Kr = Iz \cdot (Lf + Lr)/(Lf \cdot M) \qquad (4)$$

$$Gyr = Gy - Kr \cdot \gamma d \qquad (5)$$

[Formula 1]

$$\varepsilon r = 1 - \frac{\sqrt{Gxr^2 + Gyr^2}}{g\mu} \qquad (6)$$

Accordingly, with the embodiment shown in the figures, when the vehicle is in the non-driven state, the determination of step S20 is positive, the engine brake Feb is calculated in step S30; the road surface friction coefficient μ and the rear wheel degree of grip εr are calculated in step S40; and, in step S70, the threshold value Ke is calculated based upon the road surface friction coefficient μ, such that the threshold value Ke increases as the road surface friction coefficient μ becomes smaller.

In addition, in step S80, it is determined whether the rear wheel degree of grip εr is smaller than the threshold value Ke. Based on this, it is determined whether vehicle behavior is liable to become unstable when the engine brake Feb acts. When vehicle behavior is liable to become unstable, in step S90, the overall vehicle target brake force Fbvt is calculated from the sum of the engine brake force Feb and the target friction brake force Fbv. Then, the target brake force Fbti for each wheel 10FL to 10RR is calculated by hypothetically distributing the overall vehicle target brake force Fbvt amongst the wheels 10FL to 10RR in accordance with a ratio corresponding to a ratio of the ground loads Wi of the wheels 10FL to 10RR.

In step S100, the value that is smaller among the target brake forces Fbtrl and Fbtrr of the left and right rear wheels, respectively, which are the drive wheels, is taken as Fbtrmin. Then, the target output torque Tet of the engine 20 is calculated based upon the value that is Fbtrmin doubled and the gear ratio of the drive train. In step S120, the target throttle opening degree φt is calculated based on the target output torque Tet and the engine revolution no. Ne, and the command signal indicating the target throttle opening degree φt is output to the engine electronic control device 22.

Further, in step S110, the target brake pressures Pbtfl and Pbtfr for the front left and right wheels 10FL and 10FR are calculated based upon the target brake force Fbtfl and Fbtfr of the front left and right wheels 10FL and 10FR, respectively. Control is executed such that the brake pressures Pfl and Pfr of the left and right front wheels 10FL and 10FR become equal to the target brake pressures Pbtfl and Pbtfr, respectively. Along with this, the difference Δ Fbtr between the value that is larger among the target brake forces Fbtrl and Fbtrr of the left and right rear wheels 10RL and 10RR and Fbtrmin is calculated. Then, the target brake pressure Pbtr is calculated based upon the difference Δ Fbtr, and control is executed such that the brake pressures Pi of the respective wheels 10FL to 10RR become equal to the target brake pressure Pbtr.

Moreover, in step S80, when the determination is negative, namely, when the vehicle behavior is not liable to become unstable even if the engine brake Feb acts, steps S90 and S120 are not executed. In the same way as when it is determined that the vehicle is in the driven state in step S20, in step S130, communication of the master cylinder 54 and the wheel cylinders 50FR, 50FL, 50RR and 50RL is maintained; as a result, normal brake force control is executed in which the brake pressure Pi of each wheel 10FR, 10FL, 10RR and 10RL is controlled by the master cylinder pressure Pm.

Accordingly, steps S90 to S120 are only executed in the case that the vehicle behavior is liable to become unstable when the engine brake force Feb acts-in this case, the engine brake force Feb is distributed to each wheel 10FL to 10RR based on a distribution ratio that stabilizes vehicle behavior. Thus, as compared to the conventional brake force control apparatus in which engine brake force is distributed to each wheel without taking into consideration whether vehicle behavior is liable to become unstable, in the embodiment according to the invention, load is reduced of respective wheel brake devices of the wheels (amongst the left and right front wheels, which are the non-driven wheel, and the left and right rear wheels) to which substantial engine brake force is distributed. For example, when descending a steep mountain road, an operation frequency and an operation time of each wheel brake devices is reduced, and thus it is possible to improve durability.

In particular, according to the embodiment shown in the figures, the rear wheel degree of grip εr, which is utilized for determining whether the vehicle behavior is liable to become unstable when the engine brake force act, is calculated in accordance with the routine shown in FIG. 4, based upon the road surface friction coefficient μ, the vehicle front-rear acceleration Gxr at the rear wheel position, and the vehicle lateral acceleration Gyr at the rear wheel position. Thus, it is possible to easily determine whether vehicle behavior is liable to become unstable when the engine brake force acts.

Moreover, according to the embodiment shown in the figures, in step S70, the threshold value Ke is calculated based upon the road surface friction coefficient μ such that the threshold value Ke increases as the road surface friction coefficient μ becomes smaller. Then, it is determined whether the vehicle behavior is liable to become unstable when the engine brake force Feb acts, based upon whether the rear wheel degree of grip εr is smaller than the threshold value Ke. Accordingly, as the road surface friction coefficient μ becomes small, namely, as the vehicle behavior becomes more liable to become unstable, it is possible to determine that the vehicle behavior is liable to become unstable at an early stage. As a result, it is possible to effectively inhibit vehicle behavior from becoming unstable without response delay.

Hereinbefore, a specific embodiment of the invention has been described in detail. However, as will be clearly apparent to those skilled in the art, the invention is not limited to this embodiment, and can be realized through various other embodiments that fall within the scope of the invention.

For example, in the embodiment described above, the rear wheel degree of grip εr is calculated based on the vehicle front-rear acceleration and the vehicle lateral acceleration at the rear wheel position, or a front-rear force and a lateral force of the rear wheel. However, the rear wheel degree of grip εr may be calculated by a known method selected by someone skilled in the field of the art. For example, a calculation method based upon information concerning the speed of each vehicle wheel, like that disclosed in U.S. Pat. No. 6,447,076 (corresponding to Japanese Patent Laid-Open Publication No. JP-A-2000-108863) which is a joint application of the applicant of this invention and two other applicants, may be adopted.

Moreover, in the above described embodiment, the target brake force Fbti of each wheel is calculated by hypothetically distributing the overall vehicle target brake force Fbvt of the vehicle, which is the sum of the engine brake force Feb and the target friction brake force Fbv, among the wheels using in accordance with the ratio that corresponds to the ratio of the ground loads Wi of the wheels. However, the overall target friction brake force Fbvt of the vehicle may be hypothetically distributed among the wheels such that a magnitude of a difference between the vehicle yaw rate γ and a target vehicle yaw rate γt calculated based upon the steering angle θ and the vehicle speed V is reduced.

Further, in the above embodiment, the vehicle to which the invention is applied is a rear wheel drive vehicle. However, the invention may also be applied to a front wheel or a four-wheel drive vehicle.

What is claimed is:

1. A vehicular brake force control apparatus comprising:
a determination device that determines whether vehicle behavior of a vehicle is liable to become unstable when engine brake acts;
an estimation device that estimates an engine brake force when engine brake acts, in the case that it is determined that the vehicle behavior is liable to become unstable;
a distribution device that distributes the estimated engine brake force to each wheel as a target brake force in accordance with a distribution that stabilizes the vehicle behavior of the vehicle; and
a control device that controls at least one of an actual engine brake force and an actual friction control force that are applied to each wheel, such that the target brake force distributed to each wheel is attained.

2. The vehicular brake force control apparatus according to claim 1, wherein the vehicle is a rear wheel drive vehicle, and the determination device determines the vehicle behavior is liable to become unstable when engine brake acts in the case that a degree of grip of a rear wheel is equal to or less than a predetermined value.

3. The vehicular brake force control apparatus according to claim 2, wherein the determination device determines that the vehicle behavior is liable to become unstable when engine brake acts in the case that the vehicle is in a non-driven state and the degree of grip of the rear wheel is equal to or below the predetermined value.

4. The vehicular brake force control apparatus according to claim 2, wherein the determination device estimates a road surface friction coefficient, estimates a front-rear acceleration at a rear wheel position and a lateral acceleration at a rear wheel position, and calculates the degree of grip of the rear wheel based on the road surface friction coefficient, the front-rear acceleration, and the lateral acceleration.

5. The vehicular brake force control apparatus according to claim 1, wherein the determination device reduces a threshold value used on occasions when it is determined that the vehicle behavior is liable to become unstable in accordance with a road surface friction coefficient becoming smaller.

6. The vehicular brake force control apparatus according to claim 1, wherein the control device controls the engine brake force based upon the brake force that is smallest among the brake forces distributed to driven wheels.

7. The vehicular brake force control apparatus according to claim 1, wherein the distribution device estimates, when a brake operation is executed by a driver, an overall vehicle target friction brake force based upon a brake operation amount of the driver, and distributes a sum of the estimated engine brake force and the estimated overall vehicle target friction brake force among the respective wheels.

8. The vehicular brake force control apparatus according to claim 7, wherein the distribution device estimates a ground load of each wheel, and distributes the sum of the estimated engine brake force and the estimated overall vehicle target friction brake force among the respective wheels in accordance with a ratio corresponding to a ratio of the ground loads of the respective wheels.

9. The vehicular brake force control apparatus according to claim 7, wherein the distribution device calculates a vehicle target yaw rate based upon a steering amount of the driver, calculates a difference between the vehicle target yaw rate and a vehicle actual yaw rate, and distributes the sum of the estimated engine brake force and the estimated overall vehicle target friction brake force among the respective wheels such that a magnitude of the difference between the vehicle target yaw rate and the vehicle actual yaw rate reduces.

10. The vehicular brake force control apparatus according to claim 1, wherein the distribution device estimates a ground load of each wheel, and distributes the engine brake force to the respective wheels in accordance with a ratio that corresponds with a ratio of the ground loads of the wheels.

11. The vehicular brake force control apparatus according to claim 1, wherein the distribution device calculates a vehicle target yaw rate based upon a steering amount of the driver, calculates a difference between the vehicle target yaw rate and a vehicle actual yaw rate, and distributes the engine brake force such that a magnitude of the difference between the vehicle target yaw rate and the vehicle actual yaw rate reduces.

12. A vehicular brake force control method comprising the steps of:
determining whether vehicle behavior of a vehicle is liable to become unstable when engine brake acts;
estimating an engine brake force when engine brake acts in the case that it is determined that the vehicle behavior of the vehicle is liable to become unstable;
distributing the estimated engine brake force to each wheel as a target brake force in accordance with a distribution that stabilizes the vehicle behavior of the vehicle; and controlling at least one of an actual engine brake force and an actual friction control force that are applied to each wheel, such that the brake force distributed to each wheel is attained.

13. The vehicular brake force control method according to claim 12, wherein the vehicle is a rear wheel drive vehicle, and it is determined that the vehicle behavior is liable to become unstable when engine brake acts in the case that a degree of grip of a rear wheel is equal to or less than a predetermined value.

14. The vehicular brake force control method according to claim 13, wherein it is determined that the vehicle behavior is liable to become unstable when engine brake acts in the case that the vehicle is in a non-driven state and the degree of grip of the rear wheel is equal to or below the predetermined value.

15. The vehicular brake force control method according to claim 13, further comprising the steps of:
estimating a road surface friction coefficient;
estimating a front-rear acceleration at a rear wheel position and a lateral acceleration at the rear wheel position; and
calculating the degree of grip of the rear wheel based on the road surface friction coefficient, the front-rear acceleration, and the lateral acceleration.

16. The vehicular brake force control method according to claim 12, wherein a threshold value used for occasions when it is determined that the vehicle behavior is liable to become unstable is reduced in accordance with a road surface friction coefficient becoming smaller.

17. The vehicular brake force control method according to claim 12, wherein the engine brake force is controlled based upon the brake force that is smallest among the brake forces distributed to driven wheels.

18. The vehicular brake force control method according to claim 12, further comprising the step of:
estimating, when a brake operation is executed by a driver, an overall vehicle target friction brake force based upon a brake operation amount of the driver, and wherein a sum of the estimated engine brake force and the estimated overall vehicle target friction brake force is distributed among the respective wheels.

19. The vehicular brake force control method according to claim 18, further comprising the step of:
estimating a ground load of each wheel; and wherein a sum of the estimated engine brake force and the estimated overall vehicle target friction brake force is distributed according to a ratio that corresponds with a ratio of the ground loads of the wheels.

20. The vehicular brake force control method according to claim 18, further comprising the steps of:
calculating a vehicle target yaw rate based upon a steering amount of the driver; and
calculating a difference between the vehicle target yaw rate and a vehicle actual yaw rate, and wherein a sum of the estimated engine brake force and the estimated overall vehicle target friction brake force is distributed such that a magnitude of the difference between the vehicle target yaw rate and the vehicle actual yaw rate reduces.

21. The vehicular brake force control method according to claim 12, further comprising the step of:
estimating a ground load of each wheel, and wherein the engine brake force is distributed according to a ratio that corresponds with a ratio of the ground loads of the wheels.

22. The vehicular brake force control method according to claim 12, further comprising the steps of:
calculating a vehicle target yaw rate based upon a steering amount of the driver; and
calculating a difference between the vehicle target yaw rate and a vehicle actual yaw rate, and wherein the engine brake force is distributed such that a magnitude of the difference between the vehicle target yaw rate and the vehicle actual yaw rate reduces.

* * * * *